3,331,810
STABILIZED POLYMERIC COMPOSITIONS
Yoon Chai Lee, Springfield, Mass., assignor to Monsanto Company, St. Louis, Mo., a corporation of Delaware
No Drawing. Filed Sept. 20, 1963, Ser. No. 310,488
13 Claims. (Cl. 260—45.9)

This invention relates to unsaturated nitrile polymers and more particularly relates to the stabilization of such polymers against discoloration.

The presence of a combined unsaturated nitrile, such as acrylonitrile, methacrylonitrile, etc., in a polymer is known to contribute valuable properties to the polymer. However, as is well known, the unsaturated nitrile present in the polymer has a tendency to discolor it, particularly when the polymer is subjected to the elevated temperatures required for molding and extrusion operations.

An object of the invention is to provide novel unsaturated nitrile polymer compositions having a reduced tendency toward discoloration.

Another object is to provide processes for stabilizing unsaturated nitrile polymers against discoloration.

These and other objects are attained by intimately mixing an unsaturated nitrile polymer (i.e., a polymer containing at least 10% by weight of a combined unsaturated nitrile of the group consisting of acrylonitrile, methacrylonitrile, ethacrylonitrile, propacrylonitrile, butacrylonitrile, and mixtures thereof) with about 0.03–0.75%, based on the weight of the polymer, of a stabilizer selected from the group consisting of a compound corresponding to the formula:

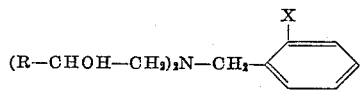

a compound corresponding to the formula:

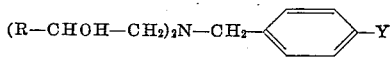

and a compound corresponding to the formula:

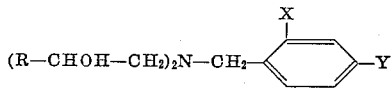

wherein R represents a member of the group consisting of —H and —CH₃, X represents a member of the group consisting of —Cl and —Br, and Y represents a member of the group consisting of —Cl, —Br, and a $C_3$–$C_7$ alkyl radical.

The following examples are given to illustrate the invention. Unless otherwise specified, quantities mentioned are quantities by weight.

EXAMPLE

Part A.—Control

Charge 200 parts of water, 67 parts of styrene, 33 parts of acrylonitrile, about 0.03 part of di-t-butyl peroxide, and about 0.03 part of a water-soluble acrylic acid/2-ethylhexyl acrylate (93.2:6.8) copolymer to a suitable, agitated reaction vessel. Pressurize the reaction mixture with nitrogen and heat at 120–150° C. for about 8 hours to copolymerize the monomers. Filter, and then wash and dry the styrene/acrylonitrile copolymer beads.

Part B

Prepare seven styrene/acrylonitrile copolymers by repeating Part A except for also including, respectively, (1) 0.2 part of 1-diisopropanolaminomethyl-4-chlorobenzene (DIPAMCB), (2) 0.3 part of DIPAMCB, (3) 0.03 part of DIPAMCB and 0.02 part of 2,6-di-t-butyl-p-cresol (DTBPC), (4) 0.09 part of DIPAMCB and 0.02 part of DTBPC, (5) 0.2 part of DIPAMCB and 0.02 part of DTBPC, (6) 0.3 part of DIPAMCB and 0.02 part of DTBPC, and (7) 0.4 part of DIPAMCB and 0.02 part of DTBPC in the charge to the reaction vessel.

Part C

Mold two 0.15 inch-thick specimens of each of the copolymers of Parts A and B. Form Specimen I of each of the copolymers by extruding the copolymer beads at about 205° C. and injection molding the extruded pellets at about 200° C. Form Specimen II of each of the copolymers by extruding the copolymer beads at about 205° C., twice re-extruding at 260° C., and injection molding the extruded pellets at about 200° C. Measure the reflectance of light of each of the specimens at 700 mu, 500 mu, and 420 mu, and calculate the three-point yellowness of the specimen in accordance with the equation:

$$3PY = 2R_{700} - (R_{500} + R_{420})$$

wherein 3PY represents the three-point yellowness value and $R_{700}$, $R_{500}$ and $R_{420}$ represent the reflectances at 700 mu, 500 mu, and 420 mu, respectively.

Part D

Calculate the color stabilizing effects of each of the additives of Part B in accordance with the equations:

$$\text{Stabilizing effect I} = \frac{100\ (Y-Z)}{Y}$$

$$\text{Stabilizing effect II} = \frac{100\ (W-X)}{W}$$

wherein Y and W represent the respective three-point yellowness values of Specimens I and II of the copolymer of Part A, and Z and X represent the respective three-point yellowness values of Specimens I and II of a copolymer of Part B. The color stabilizing effects of the additives are shown below.

| Additive | Stabilizing Effect I | Stabilizing Effect II |
|---|---|---|
| 0.2 DIPAMCB | 5 | 9 |
| 0.3 DIPAMCB | 20 | 11 |
| 0.03 DIPAMCB/0.02 DTBPC | 26 | 20 |
| 0.09 DIPAMCB/0.02 DTBPC | 30 | 20 |
| 0.2 DIPAMCB/0.02 DTBPC | 38 | 25 |
| 0.3 DIPAMCB/0.02 DTBPC | 41 | 30 |
| 0.4 DIPAMCB/0.02 DTBPC | 39 | 34 |

Part E

Calculate the difference between the three-point yellowness values of Specimens I and II of each of the copolymers of Parts A and B. Then determine the heat stabilizing effect of each of the additives of Part B in accordance with the equation:

$$\text{Heat stabilizing effect} = \frac{100\ (Y-Z)}{Y}$$

wherein Y represents the difference between the three-point yellowness values of Specimens I and II of the copolymer of Part A, and Z represents the difference between the three-point yellowness values of Specimens I and II of a copolymer of Part B. The heat stabilizing effects of the additives are shown below.

Additive:                      Heat stabilizing effect
- 0.2 DIPAMCB — 14
- 0.3 DIPAMCB — 5
- 0.03 DIPAMCB/0.2 DTBPC — 13
- 0.09 DIPAMCB/0.02 DTPC — 9
- 0.2 DIPAMCB/0.02 DTBPC — 9
- 0.3 DIPAMCB/0.02 DTBPC — 17
- 0.4 DIPAMCw/0.02 DTBPC — 32

As demonstrated in the preceding examples, 1-diisopropanolaminomethyl-4-chlorobenzene is effective in stabilizing unsaturated nitrile polymers against discoloration, and its effectiveness is enhanced by employing it in conjunction with an alkylphenol. Similar results are observed when:

(1) the stabilizer is intimately mixed with a preformed unsaturated nitrile polymer instead of being incorporated into the monomer charge employed in preparing the unsaturated nitrile polymer.

(2) the polymer being stabilized is polyacrylonitrile, polymethacrylonitrile, a styrene/acrylonitrile (50:50) copolymer, a styrene/methacrylonitrile (85:15) copolymer, an alpha-methylstyrene/acrylonitrile (80:20) copolymer, a styrene/alpha-methylstyrene/acrylonitrile (50:40:10) terpolymer, or a styrene/acrylonitrile/N-t-butyl acrylamide (70:20:10) terpolymer, (3) the 1-diisopropanolaminomethyl-4-chlorobenzene is replaced with 1-diethanolaminomethyl-2-chlorobenzene, 1 - diisopropanolaminomethyl - 2-bromobenzene, 1 - diisopropanolaminomethyl - 4 - isopropylbenzene, 1 - diethanolaminomethyl - 4 - t - butylbenzene, 1 - diisopropanolaminomethyl - 2,4 - dichlorobenzene, 1 - diisopropanolaminomethyl - 2,4 - dibromobenzene, 1 - diisopropanolaminomethyl - 2 - chloro - 4 - t - butylbenzene, or 1 - diethanolaminomethyl - 2 - bromo - 4 - heptylbenzene, or (4) the 2,6-di-t-butyl-p-cresol is replaced with 2,2'-methylene - bis(6 - t - butyl - p - cresol), 4,4' - butylidene - bis - (6 - t - butyl - m - cresol), 2 - t - butyl - 4- phenylphenol, 2,6 - dibenzyl - p - cresol, 2,6 - diisopropylphenol, 2 - t - butyl - p - cresol, or 2,6 - di - t - butylhydroquinone.

The polymers which are stabilized in accordance with the present invention are unsaturated nitrile polymers, i.e., polymers containing at least 10% by weight of a combined unsaturated nitrile polymer of the group consisting of acrylonitrile, methacrylonitrile, ethacrylonitrile, propacrylonitrile, butacrylonitrile, and mixtures thereof. Exemplary of such polymers are the homopolymers of these unsaturated nitriles, i.e., polyacrylonitrile, polymethacrylonitrile, etc.; interpolymers of two or more of these unsaturated nitriles, e.g., acrylonitrile/methacrylonitrile copolymers, acrylonitrile / methacrylonitrile / ethacrylonitrile terpolymers, etc.; interpolymers of at least 10% by weight of one or more of these unsaturated nitriles with up to 90% by weight of one or more copolymerizable monomers such as a monovinylidene aromatic hydrocarbon (e.g., styrene; an ar-alkylstyrene such as the o-, m-, and p-methylstyrenes, 2,4-dimethylstyrene, arethylstyrenes, p-t-butylstyrene, etc.; an alpha-alkylstyrene such as alpha-methylstyrene, alpha-ethylstyrene, alpha-methyl-p-methylstyrene, etc.; vinyl naphthalene; and mixtures thereof), an alkyl (alk)acrylate (e.g., methyl acrylate, ethyl acrylate, propyl acrylate, butyl acrylate, 2-ethylhexyl acrylate, the corresponding alkyl methacrylates, etc.; and mixtures thereof), an acrylamide (e.g., acrylamide; methacrylamide; an N-alkyl acrylamide such as N-methyl acrylamide, N-butyl acrylamide, etc.; and mixtures thereof), dialkyl maleates and fumarates (e.g., diethyl maleate, dibutyl fumarate, etc., and mixtures thereof), etc. Many other unsaturated nitrile polymers which contain at least 10% by weight of a combined unsaturated nitrile and which present a discoloration problem because of their unsaturated nitrile content will be obvious to those skilled in the art.

A preferred embodiment of the invention is its application to the stabilization of acrylonitrile polymers, particularly monovinylidene aromatic hydrocarbon/acrylonitrile interpolymers containing about 15–50% by weight of combined acrylonitrile. Such interpolymers include those which contain no combined monomers other than acrylonitrile and one or more monovinylidene aromatic hydrocarbons as well as those which also contain a minor amount, e.g., up to about 20% by weight, of one or more combined comonomers such as the alkyl (alk)acrylate, acrylamide, and dialkyl maleate and fumarate comonomers exemplified above.

The stabilizers of the invention are selected from the group consisting of a compound corresponding to the formula:

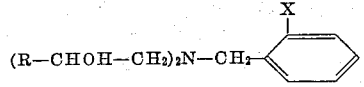

a compound corresponding to the formula:

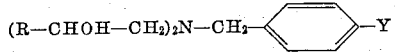

and a compound corresponding to the formula:

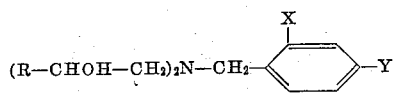

wherein R represents a member of the group consisting of —H and —CH$_3$, X represents a member of the group consisting of —Cl and —Br, and Y represents a member of the group consisting of —Cl, —Br, and a C$_3$—C$_7$ alkyl radical. Such compounds, when not easily available, can be prepared by reacting diethanolamine or diisopropanolamine with an appropriate compound corresponding to one of the formulas:

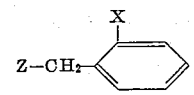

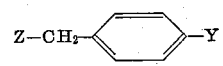

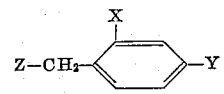

wherein X represents a member of the group consisting of —Cl and —Br, Y represents a member of the group consisting of —Cl, —Br, and a C$_3$—C$_7$ alkyl radical, and Z represents a member of the group consisting of —C and —Br.

Exemplary of the stabilizers of the invention are 1-diethanolaminomethyl-2-chlorobenzene,
1-diisopropanolaminomethyl-2-bromobenzene,
1-diisopropanolaminomethyl-4-chlorobenzene,
1-diisopropanolaminomethyl-4-isopropylbenzene,
1-diethanolaminomethyl-4-t-butylbenzene,
1-diisopropanolaminomethyl-2,4-dichlorobenzene,
1-diisopropanolaminomethyl-2,4-dibromobenzene,
1-diisopropanolaminomethyl-2-chloro-4-t-butylbenzene,
1-diethanolaminomethyl-2-bromo-4-heptylbenzene, etc.;

and mixtures thereof. The compounds having a substituent in the position para to the dialkanolaminomethyl group are especially preferred. The stabilizer is employed in concentrations of about 0.03–0.75%, preferably about 0.05–0.5%, based on the weight of the unsaturated nitrile polymer.

The alkylphenols which can be used in conjunction with the stabilizers of the invention are aromatic compounds which have at least one hydroxyl group and at least one alkyl group attached to a benzene nucleus. When used, the alkylphenols are ordinarily employed in concentrations of about 0.01–0.1%, based on the weight of the unsaturated nitrile polymer. Up to about 5% of an alkylphenol may be employed when it is mixed with a preformed unsaturated nitrile polymer, but these higher concentrations of alkylphenol are usually undesirable when it is incorporated into a monomer charge which is to be polymerized to form an unsaturated nitrile polymer.

Alkylphenols suitable for use in conjunction with the stabilizers of the invention include, e.g.:

2,2'-methylene-bis(6-t-butyl-p-cresol)
2,2'-methylene-bis(6-t-butyl-4-ethylphenol)
2,2'-methylene-bis(4-methyl-6-(1,1,3,3-tetramethylbutyl)phenol)
4,4'-thio-bis(6-t-butyl-m-cresol)
4,4'-butylidene-bis(6-t-butyl-m-cresol)
2,2-methylene-bis(4,6-dimethylphenol)
2-t-butyl-4-(4-t-butylphenyl)phenol
2-t-butyl-4-phenylphenol
2,6-dibenzyl-p-cresol
2-benzyl-p-cresol
2-benzyl-6-t-butyl-p-cresol
2-benzyl-6-t-butyl-4-ethylphenol
2,4-dimethyl-6-(1-methyl-1-cyclohexyl)phenol
2,6-diisopropyl-p-cresol
2,4-dimethyl-6-isopropylphenol
2-t-buytl-4,6-dimethylphenol
2-t-butyl-p-cresol
2-(1,1,3,3-tetramethylbutyl)-p-cresol
2,4,6-trimethylphenol
2,6-di-t-butyl-p-cresol
2,6-di-t-butyl-4-ethylphenol
2,6-diisopropylphenol
2,6-di-t-butyl-4-phenylphenol
2,6-di-t-butyl-4-(4-t-butylphenyl)phenol
2,5-di-t-butylhydroquinone
2,5-di-t-amylhydroquinone, etc.

The stabilizers of the invention and the alkylphenols, when employed, can be incorporated into the unsaturated nitrile polymers by any technique which permits their uniform distribution throughout the polymers, e.g., by blending them with preformed unsaturated nitrile polymers on a two roll mill or other suitable mixing device, by adding them to the monomer charge which is to be polymerized to form an unsaturated nitrile polymer, etc. According to a preferred embodiment of the invention, the stabilizer and the alkylphenol, when employed, are added to a polymerizable material containing at least 10% by weight of an unsaturated nitrile, and the polymerizable material is then polymerized by any desired conventional technique, e.g., by heating the polymerizable material at a temperature in the range of about 50–200° C. using a mass, solution, emulsion, suspension, batch, or continuous polymerization technique.

When desired, the stabilized compositions of the invention can contain optional additives such as plasticizers, lubricants, colorants, rubbery polymers, etc., which are sometimes added to the polymeric compositions and, in other cases, e.g., when grafting onto a rubber backbone is desired, are incorporated into the polymerizable material comprising the unsaturated nitrile.

The stabilized compositions of the invention have the obvious advantage of being characterized by a reduced tendency toward discoloration and have the additional advantage that—because of the water-insolubility of the stabilizers—objects formed from the compositions can undergo prolonged exposure to water without suffering from stabilizer leaching.

It is obvious that many variations can be made in the products and processes set forth above without departing from the spirit and scope of this invention.

What is claimed is:

1. A composition which comprises a non-elastomeric, resinous, unsaturated nitrile polymer containing at least 10% by weight of a combined unsaturated nitrile of the group consisting of acrylonitrile, methacrylonitrile, ethacrylonitrile, propacrylonitrile, butacrylonitrile, and mixtures thereof, said nitrile polymer being selected from the class consisting of homopolymers of the nitriles of said group, interpolymers of the nitriles of said group with each other, and interpolymers of said group with at least one monomer of the class consisting of monovinylidene aromatic hydrocarbons, alkyl acrylates, alkyl alkacrylates, acrylamides, N-alkyl acrylamides, dialkyl maleates, and dialkyl fumarates, in intimate admixture with about 0.03–0.75%, based on the weight of the polymer, of a stabilizer selected from the group consisting of a compound corresponding to the formula:

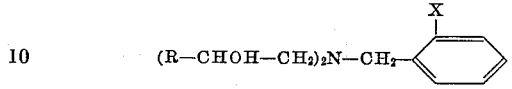

a compound corresponding to the formula:

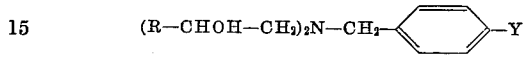

and a compound corresponding to the formula:

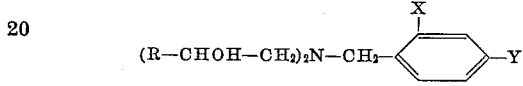

wherein R represents a member of the group consisting of —H and —CH$_3$, X represents a member of the group consisting of —Cl and —Br, and Y represents a member of the group consisting of —Cl, —Br, and a C$_3$–C$_7$ alkyl radical.

2. The composition of claim 1 wherein the combined unsaturated nitrile is acrylonitrile.

3. The composition of claim 1 wherein the unsaturated nitrile polymer is a monovinylidene aromatic hydrocarbon/acrylonitrile interpolymer containing about 15–50% by weight of combined acrylonitrile.

4. The composition of claim 3 wherein the monovinylidene aromatic hydrocarbon/acrylonitrile interpolymer is a styrene/acrylonitrile copolymer.

5. The composition of claim 3 wherein the monovinylidene aromatic hydrocarbon/acrylonitrile interpolymer is an alpha-methylstyrene/acrylonitrile copolymer.

6. The composition of claim 3 wherein the monovinylidene aromatic hydrocarbon/acrylonitrile interpolymer is a styrene/alpha-methylstyrene/acrylonitrile terpolymer.

7. The composition of claim 1 wherein the stabilizer is 1-diisopropanolaminomethyl-4-chlorobenzene.

8. The composition of claim 1 wherein the concentration of the stabilizer is in the range of about 0.05–0.5%, based on the weight of the polymer.

9. A composition which comprises a non-elastomeric, resinous, unsaturated nitrile polymer containing at least 10% by weight of a combined unsaturated nitrile of the group consisting of acrylonitrile, methacrylonitrile, ethacrylonitrile, propacrylonitrile, butacrylonitrile, and mixtures thereof, said nitrile polymer being selected from the class consisting of homopolymers of the nitriles of said group, interpolymers of the nitriles of said group with each other, and interpolymers of said group with at least one monomer of the class consisting of monovinylidene aromatic hydrocarbons, alkyl acrylates, alkyl alkacrylates, acrylamides, N-alkyl acrylamides, dialkyl maleates, and dialkyl fumarates, in intimate admixture with about 0.01–0.1% by weight of an alkylphenol and about 0.03–0.75% by weight of a stabilizer selected from the group consisting of a compound corresponding to the formula:

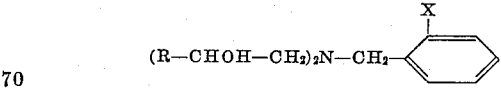

a compound corresponding to the formula:

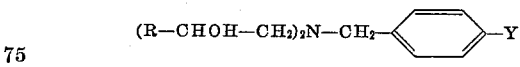

and a compound corresponding to the formula:

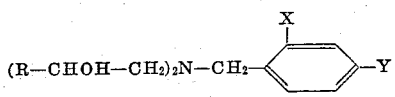

wherein R represents a member of the group consisting of —H and —CH$_3$, X represents a member of the group consisting of —Cl and —Br, and Y represents a member of the group consisting of —Cl, —Br, and a C$_3$–C$_7$ alkyl radical.

10. The composition of claim 9 wherein the alkylphenol is 2,6-di-t-butyl-p-cresol.

11. A composition which comprises a monovinylidene aromatic hydrocarbon/acrylonitrile interpolymer containing about 15–50% by weight of combined acrylonitrile in intimate admixture with about 0.01–0.1% by weight of 2,6-di-t-butyl-p-cresol and about 0.05–0.5% by weight of 1-diisopropanolaminomethyl-4-chlorobenzene.

12. The composition of claim 11 wherein the monovinylidene aromatic hydrocarbon/acrylonitrile interpolymer is a styrene/acrylonitrile copolymer.

13. A process which comprises dissolving about 0.03–0.75 part by weight of a stabilizer in 100 parts by weight of a polymerizable material comprising an unsaturated nitrile of the group consisting of acrylonitrile, methacrylonitrile, ethacrylonitrile, propacrylonitrile, butacrylonitrile, and mixtures thereof with each other and with copolymerizable monomers selected from the class consisting of monovinylidene aromatic hydrocarbons, alkyl acrylates, alkyl alkacrylates, acrylamides, N-alkyl acrylamides, dialkyl maleates, and dialkyl fumarates, said unsaturated nitriles comprising at least 10% by weight of said polymerizable material, and heating to polymerize the polymerizable material to a non-elastomeric, resinous polymer; said stabilizer being a compound selected from the group consisting of a compound corresponding to the formula:

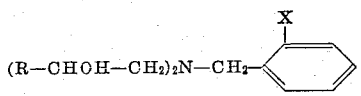

a compound corresponding to the formula:

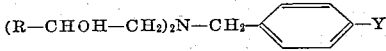

and a compound corresponding to the formula:

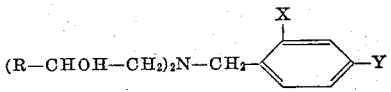

wherein R represents a member of the group consisting of —H and —CH$_3$, X represents a member of the group consisting of —Cl and —Br, and Y represents a member of the group consisting of —Cl, —Br, and a C$_3$–C$_7$ alkyl radical.

References Cited

UNITED STATES PATENTS

| | | | |
|---|---|---|---|
| 2,654,679 | 10/1953 | Goppel et al. | 260—45.9 |
| 2,802,810 | 8/1957 | Bill | 260—45.9 |
| 2,984,648 | 5/1961 | Williams et al. | 260—45.95 |
| 3,219,701 | 11/1965 | O'Shea | 260—809 |
| 3,224,974 | 12/1965 | Boag et al. | 260—809 |
| 3,252,934 | 5/1966 | Jankens | 260—45.95 |

FOREIGN PATENTS 934,054    8/1963    Great Britain.

DONALD E. CZAJA, *Primary Examiner.*

LEON J. BERCOVITZ, *Examiner.*

H. E. TAYLOR, *Assistant Examiner.*